United States Patent [19]

Martin

[11] Patent Number: 4,676,337
[45] Date of Patent: Jun. 30, 1987

[54] SEISMIC VIBRATOR BASEPLATE

[75] Inventor: Dallas J. Martin, Friendswood, Tex.

[73] Assignee: Western Geophysical Company of America, Houston, Tex.

[21] Appl. No.: 771,803

[22] Filed: Sep. 3, 1985

[51] Int. Cl.⁴ ............................................. G01V 1/02
[52] U.S. Cl. .................................... 181/113; 181/121; 181/401; 367/189
[58] Field of Search ................ 367/189, 190, 191; 181/113, 114, 119, 121; 403/408.1, 388, 13, 14

[56] References Cited

U.S. PATENT DOCUMENTS 3,911,388 10/1975 Crump et al. ...................... 367/188
4,035,093 7/1977 Redshaw ......................... 403/408.1
4,458,777 7/1984 Weber et al. ....................... 367/189

Primary Examiner—Charles T. Jordan
Assistant Examiner—John W. Eldred
Attorney, Agent, or Firm—Barry C. Kane; William A. Knox; Robert E. Lowe

[57] ABSTRACT

A baseplate for a seismic vibrator is formed from two identical cast plate members having stiffening ribs and alternating plug and socket cones along the ribs. The cast plate members are arranged together to align opposed plug and socket cones of the plates and are connected by attaching mechanisms passing through holes in the aligned cones. The aligned cones accomplish a wedging or clamping action on each other when the plate members are connected.

15 Claims, 3 Drawing Figures

SEISMIC VIBRATOR BASEPLATE

BACKGROUND OF INVENTION

1. Field of Invention

The present invention relates to seismic vibrator baseplates for seismic exploration.

2. Description of Prior Art

Baseplates for seismic vibrators have been used to couple the vibrator to the earth surface while transmitting vibratory seismic energy into the earth. In the past, these baseplates have been made by using solid plate members, by casting a unitary baseplate with heavy ribs in the form of a group of parallel tubes, or by welding a number of parallel beams together. U.S. Pat. No. 4,253,538 sets forth an example of the parallel beam, welded baseplates. Another type of baseplate is also described in U.S. Pat. No. 4,253,538. Two solid plate sections were milled on their inner faces to leave a honeycomb appearance over a substantial portion of the inner face or surface. Certain portions of the plate sections were left unmilled to form locations for bolting the plate sections together. This type of baseplate was inefficient in terms of material costs in that a substantial portion of what was originally a solid plate was milled away to form the honeycomb structure. It was also very expensive to fabricate.

SUMMARY OF INVENTION

Briefly, the present invention provides a new and improved baseplate for a seismic vibrator. The baseplate takes the form of first and second plate members which are connected together by suitable connector members. Each of the plate members has a substantially flat outer contact surface and a recessed inner surface. A raised outer rim is formed about the periphery of the inner surface and stiffener ribs are formed extending across the inner surface within the rim. Connector cones are formed at spaced portions on the inner surface and are adapted to be aligned with connector cones of the other plate.

The connector cones take the form of plug cones and socket cones, preferably arranged in alternation along the stiffener ribs at selected locations. Connector passages are formed through the connector cones for connector members to be inserted to connect the plate members together. With the present invention, the plate members may be of identical shape and cast from the same mold. In assembling the baseplate, one of the two cast plate members is reversed in position in the horizontal plane and placed on top of the other. This aligns the plug cones of the plates with the socket cones of the other plate. When the plates are connected together, the aligned connector cones exert a clamping action on each other.

DESCRIPTION OF PREFERRED EMBODIMENT

Figure 1:
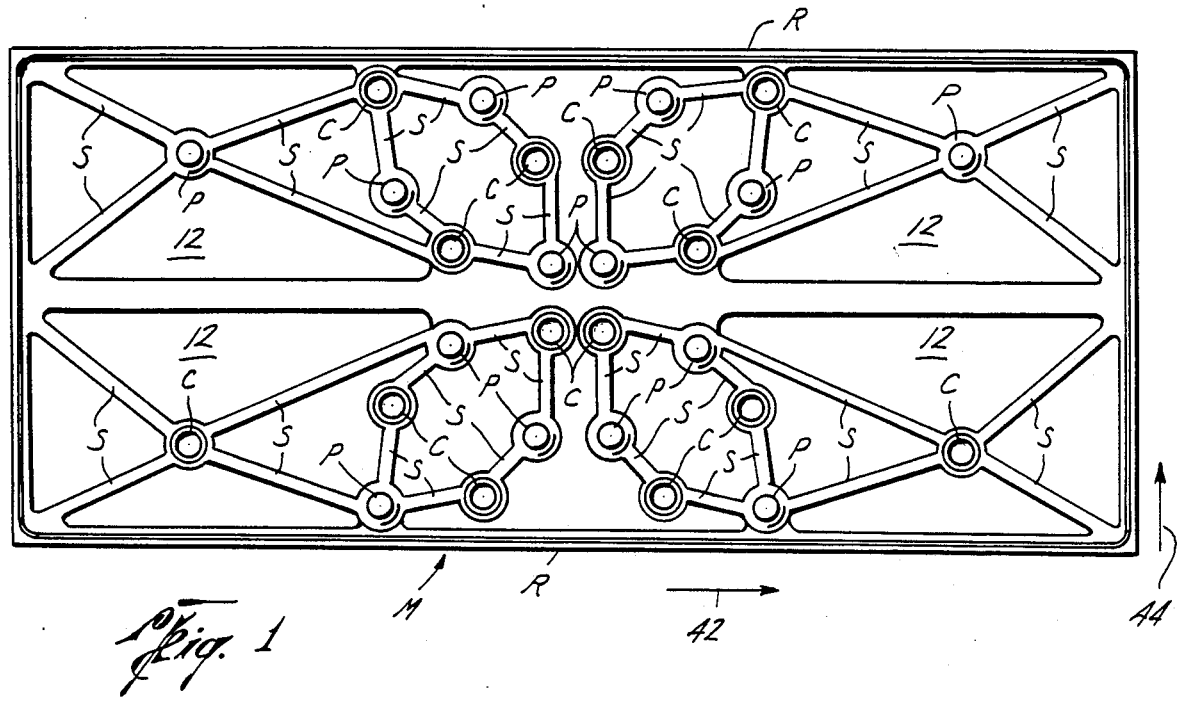
FIG. 1 is a plan view of a plate member for a baseplate according to the present invention.
Figure 2:
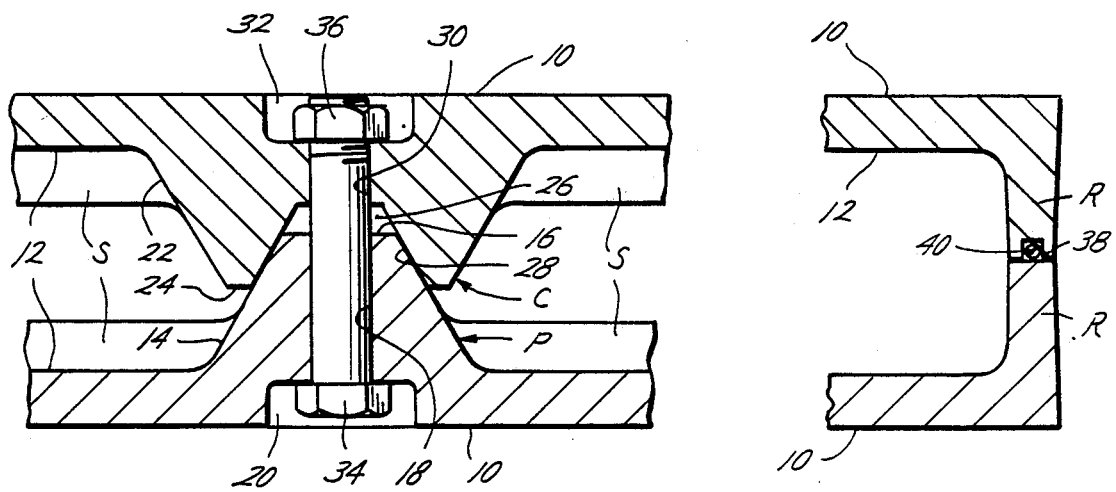
FIGS. 2 and 3 are enlarged views, partly in cross-section, of portions of two of the plate members of FIG. 1 assembled to form a baseplate according to the present invention.
Figure 3:
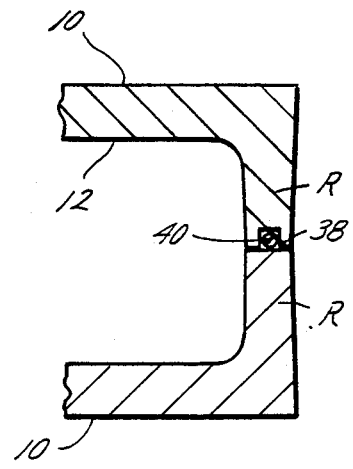

In the drawings, the letter B designates generally a baseplate for a seismic vibrator. The baseplate B is formed from two identical plate members M and accordingly only a first plate member M is shown in detail in the drawings (FIG. 1). Each of the plate members M include a substantially flat outer contact surface 10 (FIG. 2). One of the contact surfaces 10 engages the earth's surface beneath the seismic vibrator, while the other contact surface 10 is adapted to be connected to the seismic vibrator. The connection of the base plate B to the vibrator is conventional and is not shown in the drawings in order to more clearly see other structure of the present invention.

The plate members M further include a recessed inner surface 12 formed on an opposite side from the contact surface 10 and a raised outer rim R formed about the periphery of the recessed inner surface 12. Stiffener ribs S are formed extending across the inner surface 12 within the rim R on each of the plate members M. A plurality of connector cones are formed at spaced positions on the inner surface 12 of the plate member M. The connector cones take the form of plug cones P and socket cones C. Preferably, the plug cones P and the socket cones C are located in alternating order along the stiffener ribs S. Further, the location of the plug cones P and socket cones C on an upper half of the plate member M is the opposite of the location of such cones on the lower half of the plate member M (FIG. 1) for reasons to be set forth below.

The plug cones P are formed projecting from the inner surface 12, having a tapered outer surface 14 with a converging taper in the direction of projection from the inner surface 12 along their extent to an inner end 16 (FIG. 2). A connector opening is formed in the plug cone P adjacent a cylindrical surface 18 extending from the inner end 16 to a mounting socket 20 formed in the outer surface 10 of the plate member M.

The socket cones C are also formed projecting from the inner surface 12, having an outer tapered surface 22 with a converging taper along its extent away from the inner surface 12 to an inner lip or rim 24. A receptor cup 26 is formed extending toward the inner surface 12 of the plate member M away from the lip or rim 24. The receptor cup 26 is formed having a diverging taper, defined by a tapered inner wall 28 in the direction of projection of socket cone C from inner surface 12.

Preferably, the amount of taper of the surface 28 of the receptor cup 26 in the socket cone C is substantially the same as the taper of the surface 14 of the plug cone P, for reasons to be set forth.

A connector opening is formed adjacent a cylindrical surface 30 extending from the receptor cup 26 to an outer mounting socket 32 formed in the contact surface 10 of the plate member M. The connector openings 18 and 30 in the plug cone P and the socket cone C are formed to permit passage of suitable connector members, in the embodiment shown as a bolt 34 and a nut 36 so that the plate members M may be connected to each other to form the base plate B.

A slot 38 is formed in the rim R about the periphery of the plate member M so that an O-ring 40 or other suitable sealing structure may be mounted therein. The sealing member 40 forms a face seal between the adjacent rims R, preventing spaces within the plate members M from filling with water, mud, dirt or the like.

As has been set forth above, the plate members M are of identical configuration and shape to each other. Thus, a single mold can be used and the plate members M cast from the same mold from a material having a high strength-to-weight ratio, such as aluminum. Further, the location of the stiffener ribs S, plus cones P and socket cones C can be selected so that a constant stress beam can be simulated by the base plate B. This placement of the stiffener ribs S and the cones P and C allows cavities or voids to be left in the plate member M where unnecessary material would normally be present. This allows the cast plate members M to be highly cost effective.

The base plate B is formed from two of the identical plate members M by rotating one of the plate members M in the horizontal plane, either about its longitudinal axis as indicated by an arrow 42 or its transverse axis as indicated by an arrow 44. Reversal of one of the plate members M in position in the horizontal plane in this manner aligns the plug cones P of each of the two plate members M with the socket cones C of the other. The plate members M are then brought into engagement with each other, with the tapered surface 14 and 28 contacting each other. The plate members M are then connected to each other, such as by the bolts 34 passing through the connector openings 18 and 30 and receiving the nuts 36. The connector members are then tightened, bringing the tapered surfaces 14 and 28 of the connector cones into firm, mated engagement with each other. A clamping effect is accomplished by the tapered sides 14 and 28 acting against each other as wedges.

While the described embodiment uses conical plugs and sockets as interlocking means between the two halves of the baseplate it will be obvious to those skilled in the mechanical arts that other mating tapered shapes such as, for example, wedges or pyramids will serve as alternate interlocking means. It is therefore to be understood that the term "cone" as used herein should include all suitable interlocking tapered shapes.

The baseplate B of the present invention has a high strength-to-weight ratio since it can be made from a material such as aluminum. Further, the baseplate B does not require that material be present in areas where not necessary for strength purposes. Further, since the plate members M can be cast, the baseplate B of the present invention are relatively inexpensive to manufacture. The plate members M of the baseplate B also eliminate stress concentrations caused by welding.

The foregoing disclosure and description of the invention are illustrative and explanatory thereof, and various changes in the size, shape and materials, as well as in the details of the illustrated construction may be made without departing from the spirit of the invention.

I claim:

1. A baseplate for a seismic vibrator, comprising:
   (a) first and second plate members, each comprising:
      (1) a substantially flat outer contact surface;
      (2) a recessed inner surface;
      (3) a raised outer rim formed about the periphery of said inner surface;
      (4) a plurality of stiffener ribs formed extending across said inner surface within said rim;
      (5) a plurality of first connector cone means formed at spaced positions on said inner surface and adapted to be aligned with a corresponding plurality of second connector cone means of the other of said plate members, and
   (b) means for connecting said first and second plate members together to form the baseplate.

2. The apparatus of claim 1, wherein said plurality of first connector cone means comprises:
   a plurality of cones projecting from said inner surface.

3. The apparatus of claim 2, wherein:
   said cones have converging taper in their direction of projection from said inner surface.

4. The apparatus of claim 1, wherein said plurality of second connector cone means comprises:
   a plurality of cones formed projecting from said inner surface and having a receptor cup formed therein.

5. The apparatus of claim 4, wherein:
   said receptor cups have diverging taper in the direction of projection of said cones from inner surface.

6. The apparatus of claim 1, wherein said first and second connector cone means each comprises:
   (a) a plurality of plug connector cones projecting from said inner surface;
   (b) a plurality of socket connector cones projecting from said inner surface and having a receptor cup formed therein extending toward said inner surface.

7. The apparatus of claim 6, wherein:
   (a) said plug connector cones have converging taper along their direction of projection from said inner surface;
   (b) said receptor cups of said socket cones have diverging taper in the direction towards said inner surface.

8. The apparatus of claim 7, wherein:
   (a) said plug connector cones of one of said connector cone means and said receptor cups of the other of said connector cone means mate together when said first and second base plate members are connected.

9. The apparatus of claim 7, wherein:
   the degree of taper of said plug connector cones and said receptor cups of said socket cones is substantially equal.

10. The apparatus of claim 1, wherein:
    said plurality of first and second connector cones is formed at spaced positions on said stiffener ribs.

11. The apparatus of claim 10, wherein said plurality of first and second connector cone means comprises:
    (a) a first plurality of plug connector cones projecting from said inner surface;
    (b) a second plurality of socket connector cones projecting from said inner surface and having a receptor cup formed therein extending toward said inner surface.

12. The apparatus of claim 10, wherein:
    said plug connector cones and said socket connector cones are formed in alternating order on said stiffener ribs.

13. The apparatus of claim 1, further including:
    connector openings formed in said connector cone means for receiving said means for connecting therein.

14. The apparatus of claim 1, further including:
    face seal means mounted in said outer rim of at least one of said plate members for sealing the connection between said plate members.

15. The apparatus of claim 1, wherein:
    said stiffener ribs intersect at points of intersection with others of said stiffener ribs over their extent across said inner surface.

* * * * *